(12) United States Patent
Pujari et al.

(10) Patent No.: US 8,071,495 B2
(45) Date of Patent: Dec. 6, 2011

(54) SILICON NITRIDE BODY AND METHOD OF MANUFACTURE

(75) Inventors: Vimal K. Pujari, Northboro, MA (US); William T. Collins, Auburn, MA (US)

(73) Assignee: Ceramatec, Inc., Salt Lake City, UT (US)

(*) Notice: Subject to any disclaimer, the term of this patent is extended or adjusted under 35 U.S.C. 154(b) by 83 days.

(21) Appl. No.: 11/962,352

(22) Filed: Dec. 21, 2007

(65) Prior Publication Data
US 2008/0150199 A1    Jun. 26, 2008

Related U.S. Application Data

(60) Provisional application No. 60/871,547, filed on Dec. 22, 2006.

(51) Int. Cl.
C04B 35/587 (2006.01)

(52) U.S. Cl. ...................................... 501/97.2

(58) Field of Classification Search ................. 501/97.2
See application file for complete search history.

(56) References Cited

U.S. PATENT DOCUMENTS

| | | | |
|---|---|---|---|
| 4,743,571 A | 5/1988 | Steinmann et al. | |
| 4,935,388 A | 6/1990 | Lucek | |
| 5,021,372 A | 6/1991 | Pyzik et al. | |
| 5,030,599 A * | 7/1991 | Quadir et al. | 501/98.3 |
| 5,100,847 A * | 3/1992 | Li et al. | 501/97.2 |
| 5,118,645 A | 6/1992 | Pyzik et al. | |
| 5,160,508 A | 11/1992 | Pyzik et al. | |
| 5,312,788 A | 5/1994 | Li et al. | |
| 5,512,522 A | 4/1996 | Yeckley | |
| 5,545,362 A * | 8/1996 | Hirosaki et al. | 264/647 |
| 5,545,597 A * | 8/1996 | Yeckley | 501/97.2 |
| 5,618,768 A * | 4/1997 | Higuchi et al. | 501/92 |
| 5,631,200 A * | 5/1997 | Ukegawa et al. | 501/97.2 |
| 5,637,540 A * | 6/1997 | Li et al. | 501/97.2 |
| 5,674,793 A * | 10/1997 | Hirao et al. | 264/636 |
| 5,705,449 A * | 1/1998 | Hirao et al. | 501/97.1 |
| 5,908,796 A * | 6/1999 | Pujari et al. | 501/97.1 |
| 5,912,200 A * | 6/1999 | Miyake et al. | 501/92 |
| 6,066,582 A * | 5/2000 | Collin et al. | 501/97.2 |
| 6,544,917 B1 * | 4/2003 | Miyanaga et al. | 501/154 |
| 6,784,131 B2 | 8/2004 | Komatsu et al. | |
| 6,797,660 B2 | 9/2004 | Komatsu | |
| 6,977,233 B2 * | 12/2005 | Li et al. | 501/92 |

FOREIGN PATENT DOCUMENTS

| | | |
|---|---|---|
| EP | 0219885 | 4/1987 |
| EP | 0228276 | 7/1987 |
| EP | 0472256 | 2/1992 |
| EP | 0661245 | 7/1995 |

(Continued)

OTHER PUBLICATIONS

K. Niihara, A fracture mechanics analysis of indentation-induced Palmqvist crack in ceramics, Journal of Materials Science Letters, 1983, pp. 221-223, vol. 2.

(Continued)

*Primary Examiner* — Karl Group
(74) *Attorney, Agent, or Firm* — David Fonda

(57) ABSTRACT

A densified silicon nitride body can be formed using a lanthana-based sintering aid. The composition may exhibit properties that provide a material useful in a variety of applications that can benefit from improved wear characteristics. The composition may be densified by sintering and hot isostatic pressing.

5 Claims, 1 Drawing Sheet

FOREIGN PATENT DOCUMENTS

| EP | 1770075 | | 4/2007 |
|---|---|---|---|
| GB | 1496305 | | 12/1977 |
| JP | 2002121072 | * | 5/2002 |
| JP | 2004067405 | * | 3/2004 |

OTHER PUBLICATIONS

Y.B.Guo et al., An experimental investigation of white layer on rolling contact fatigue using acoustic emission technique, International Journal of Fatigue, 2005, pp. 1051-1061, vol. 27.

Genuine Cerbec Ceramic Balls Manual, www.cerbec.com, Saint-Gobain Ceramics, 6 pages, printed Apr. 29, 2008.

International Preliminary Report on Patentability dated Apr. 8, 2009 issued in PCT Application No. PCT/US2007/088546, 11 pages.

International Search Report and Written Opinion dated Apr. 25, 2008 issued in corresponding PCT Patent Application No. PCT/US2007/088546, 15 pages.

AS800 Silicon Nitride—In-Situ Reinforced Microstructure—Slipcast-Sintered, Honeywell Ceramic Components data sheet 1/00, 1 page.

GS-44Silicon Nitride—In-Situ Reinforced Microstructure, Honeywell Ceramic Components data sheet Feb. 5, 1998, 1 page.

Pollinger, The Development of Monolithic Silicon Nitride Structural Ceramics at Honeywell, Ceramic Gas Turbine Component Development and Characterization—Progress in Ceramic Gas Turbine Development, vol. 2, pp. 97-123.

European Communication dated Nov. 17, 2009 issued in corresponding European Patent Application No. 07855322.9, 2 pages.

* cited by examiner

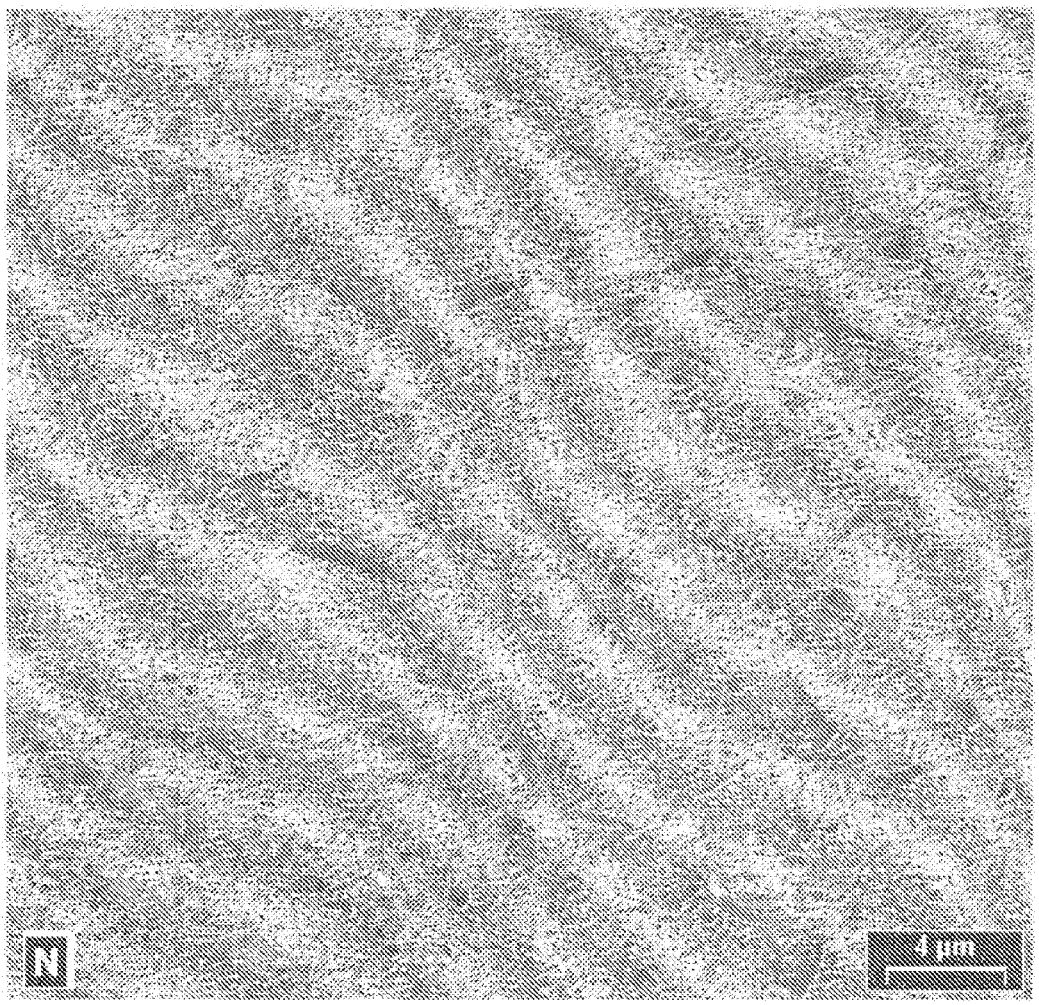
FIGURE

SILICON NITRIDE BODY AND METHOD OF MANUFACTURE

RELATED APPLICATION

This application claims benefit of U.S. Provisional Patent Application Ser. No. 60/871,547, titled "SILICON NITRIDE BODY AND METHOD OF MANUFACTURE" filed Dec. 22, 2006, the contents of which are hereby incorporated by reference herein.

BACKGROUND

1. Field of Invention

The invention relates to silicon nitride compositions and, in particular, to silicon nitride bodies including lanthanum.

2. Discussion of Related Art

Silicon nitride ($Si_3N_4$) materials comprise a class of ceramics that has been shown to provide excellent characteristics in high wear applications including, for example, bearings, cutting tools, vanes and blades, and valves and seals. These properties include low density, high hardness, high temperature tolerance, high dielectric strength and extended wear capabilities. Typically, silicon nitride bearing elements have lower density, greater hardness, a higher elastic modulus and higher temperature ratings than do steel components. For these reasons and others silicon nitride components have replaced steel and alloy components in many applications. One example is the use of high speed hybrid bearings consisting of silicon nitride rolling elements and steel races.

Several methods of forming silicon nitride bodies are known. Typically, silicon nitride bodies are densified by applying heat and pressure to green bodies of silicon nitride powder. These techniques include sintering in the presence of a sintering aid and/or hot isostatic pressing (HIP) to form consistent durable bodies. Known sintering aids include, for example, aluminum oxide (alumina) and yttrium oxide (yttria). Sintering aids may be added in the form of a fine mesh powder to the silicon nitride powder prior to densification, and a variety of materials have been developed to improve characteristics, such as hardness.

U.S. Pat. No. 5,908,796 to Pujari et al. describes a silicon nitride body made using TiC of a small grain size. According to the Pujari disclosure, the resulting body provides improved wear and flexural properties. Products such as bearing components can benefit from these improved wear and flexural properties.

SUMMARY OF INVENTION

In one aspect, a densified silicon nitride body is provided, the silicon nitride body having a fracture toughness of greater than 8.0 MPam$^{1/2}$.

In another aspect, a method of making a silicon nitride body is provided, the method comprising sintering a green body of silicon nitride powder at a temperature of between 1650 and 1800 degrees and hot isostatic pressing the sintered body at a temperature between 1680 and 1800 degrees Celsius to form the silicon nitride body.

In another aspect, a silicon nitride bearing element is provided, the silicon nitride bearing element comprising silicon nitride, at least 1% lanthanum, and at least 1% neodymium.

In another aspect, a method of making a silicon nitride body exhibiting high fracture toughness is provided, the method comprising sintering a green body comprising silicon nitride powder to form a sintered body, and hot isostatic pressing the sintered body to form a silicon nitride body exhibiting a fracture toughness of greater than 8.0 MPam$^{1/2}$.

In another aspect, a sintered silicon nitride body is provided, the silicon nitride body comprising greater than or equal to 1% lanthanum and greater than or equal to 1% neodymium.

The subject matter of this application may involve, in some cases, interrelated products, alternative solutions to a particular problem, and/or a plurality of different uses of a single system or article.

BRIEF DESCRIPTION OF DRAWINGS

In the drawings, the FIGURE is a photocopy of a scanning electron micrograph of one embodiment of a densified silicon nitride material.

DETAILED DESCRIPTION

A "silicon nitride body" is a unitary body comprising at least 70% silicon nitride by weight.

The "fracture toughness" of silicon nitride bodies may be an important parameter to measure in order to evaluate the material's usefulness in a variety of applications such as, for example, bearing components. Fracture toughness can be measured using different techniques, and it may be difficult to directly compare the fracture toughness of silicon nitride based materials when different test methods are used. For example, it is believed that when using an indentation-based test method, the shape and size of the indentation may affect the results. Therefore a head-to-head comparison of test results from different methods using different indentation techniques may not be useful. It is believed that measuring fracture toughness ($K_{1C}$) using an "Indentation Strength Four Point Bending" technique can provide reasonably consistent results and therefore the materials described herein have been tested using such a technique. Specifically, the method used was based on the Laugier, Evans and Lawn equations as modified by Niihara, *J. Mater, Sci. Letter, V.* 2, p. 221, 1983, which is incorporated by reference herein This method has been shown to provide consistent results that can be replicated as well as, or better than, other methods known to the inventors. As used herein, "Fracture Toughness" refers to $K_{1C}$ as determined using this method and the equation described by Niihara:

$$K_{1C}=0.0186[(E/H)]^{1/8}[S(P*9.807)^{1/3}]^{3/4} \text{ where:} \quad \text{(Eq. 1)}$$

E is the Young's Modulus; for sintered silicon nitride materials this is typically about 310 GPa;

H is the hardness, for sintered silicon nitride materials typically about 15 GPa;

S is the peak stress, to be empirically determined for each sample as described in Niihara;

P is the indentation load and when used herein is 10 kg unless otherwise stated.

Once the peak stress (S) has been determined for a densified silicon nitride body, the $K_{1C}$ can be calculated using this equation. Results are provided in units of MPam$^{1/2}$.

Unless otherwise specified all percentages provided herein are on a mass basis.

In one aspect, a silicon nitride composition made from a mixture including lanthana can provide a silicon nitride body exhibiting improved wear characteristics. One area in which the composition may be useful is in applications that can benefit from a high level of wear resistance, for example, in roller bearings, valves and seals, and cutting tools. The inclusion of lanthana in silicon nitride may provide the resulting silicon nitride body with improved properties such as, for example, toughness and hardness. Lanthana may be used, for instance, at levels of greater than or equal to 1%, greater than or equal to 2%, greater than or equal to 3%, greater than or equal to 4% or greater than or equal to 5% by weight. In other embodiments, lanthana may be used at amounts of less than 10%, less than 6%, less than 5%, less than 4%, less than 3% or less than 2%.

In another aspect, a method of manufacture includes forming a green body that includes both silicon nitride powder and lanthana powder and subsequently densifying the body. For instance, the green body may be sintered and hot isostatically pressed (HIP) to form a silicon nitride body. This densification may result in a body having a density of greater than 99.5%, greater than 99.7% or greater than 99.9% of theoretical density (using the rule of mixtures). Resulting porosity of the densified body may be discontinuous and may be less than 0.5%, less than 0.2% or less than 0.1%. Maximum pore size may be, for example, less than 10 μm, less than 5 μm, or less than 2 μm by SEM analysis. SEM analysis for determining maximum pore size is performed using the following method unless otherwise described. Ten different SEM images are taken using a 20 μm bar (magnification). Each image is of a different region of the same surface of the material being evaluated. Using the cursor on the image display, 10 pores from each image are measured for a total of 100 pore measurements. The "maximum pore size" is the greatest single measurement of the 100 measurements that are made. Thus, all measured pores will have a size less than or equal to the "maximum pore size." For instance, if the largest pore size of the 100 that are measured is 2.0 μm, then the maximum pore size for that material is 2.0 μm.

In one embodiment, a silicon nitride body comprising lanthanum may be produced by first introducing lanthanum into the composition as lanthana powder. The mixture may be sintered and/or hot isostatically pressed to produce a silicon nitride body exhibiting a fracture toughness of greater than or equal to 7.0 MPam$^{1/2}$, greater than or equal to 7.5 MPam$^{1/2}$, greater than or equal to 8.0 MPam$^{1/2}$, or greater than or equal to 8.1 MPam$^{1/2}$ when determined by $K_{1C}$ as refined by Niihara. Values for Vickers Hardness, measured at a test load of 10 Kg, may be greater than or equal to 1 GPa, greater than or equal to 5 GPa, greater than or equal to 10 GPa, greater than or equal to 13.5 GPa, greater than or equal to 14.0 GPa or greater than or equal to 14.5 GPa.

It is believed that the improved characteristics of this material may be, at least in part, the result of the control of grain width growth due to the interaction of lanthanum atoms at the grain growth boundary and that the use of lanthanum may promote growth along the c-axis to provide a longer and narrower grain shape. Experimental results show that the ratio of grain length to grain width (aspect ratio) may be greater when sintered with lanthana than with other sintering aids such as yttria. For instance, the mean aspect ratio of silicon nitride grains sintered with lanthana may be at least 2.0 and in some cases at least 2.1. Mean grain width may be less than or equal to 0.50 μm, 0.40 μm, 0.30 μm or less than or equal to 0.29 μm. The resulting grain shapes may provide for a material exhibiting, for example, higher fracture toughness, hardness, and crush resistance when compared to other silicon nitride bodies.

In addition, the largest dimension of the intergranular glassy phase (triple point) in the densified silicon nitride body may be less than 2 μm and in some cases less than about 1 μm. This small intergranular glassy phase may help to reduce the frequency of spalling when compared to materials produced using other sintering aids.

Lanthana may be introduced into silicon nitride using methods known in the art. For example, lanthana powder may be milled with silicon nitride powder prior to shape formation. Preferably, the lanthana is of high purity and may be, for example, greater than 99.5, greater than 99.9 or greater than 99.99% pure. To facilitate even dispersion among silicon nitride grains, it may be preferred that lanthana powder be provided in a size smaller than about 2 μm. It has been found that the lanthana powder may be evenly dispersed throughout the mixture by, for example, high energy mixing and/or ball milling, attrition milling or vibratory milling.

In addition to lanthana, other compounds may also be used to aid in sintering or other functions. For instance, other rare earth oxides such as neodymium oxide or yttria may be added. For example, these compounds may be useful in reducing the effective sintering temperature. Additional compounds may include, for example, alumina, nitrides such as aluminum nitride, magnesia, titanium oxide, and metal carbides such as, for example, titanium carbide.

In some embodiments, the silicon nitride body may be essentially free of rare earth elements other than lanthanum and/or neodymium. If a body is essentially free of these elements it contains only trace or minor amounts that do not substantially alter the properties of the composition. In one embodiment, the body may be essentially free of yttria and/or strontium.

Table 1 provides examples of concentration ranges for different components that have been found to be useful in one embodiment. Of course, sintering and hot isostatic pressing may effect chemical changes within the composition and a final composition may not be chemically identical to that of the starting composition. Therefore, the listed compounds and concentrations are directed to the starting material and not necessarily the densified silicon nitride body.

TABLE 1

| Component | $Si_3N_4$ | Lanthana | Alumina | $Nd_2O_3$ | AlN | TiC | $TiO_2$ |
|---|---|---|---|---|---|---|---|
| Exemplary Range - % by weight | 80-90 | 1-6 | 1-6 | 1-6 | 0.5-1.5 | 0-0.8 | 0-1.0 |
| Preferred Range - % by weight | 85-88 | 3-5 | 3-5 | 3-5 | 0.8-1.2 | 0.5 | 0.5 |

In one embodiment, a silicon nitride body may be densified by, for example, sintering and hot isostatic pressing. The starting material may include silicon nitride powder having a particle size of about less than or equal to 0.8 μm and a purity of greater than or equal to 99%. This starting material may be mixed with sintering aids and other additives such as those listed in Table 1 and the mixture may be homogenized by milling or using other mixing techniques known to those skilled in the art.

A green body may be formed from the powder into the general shape of the desired end product—for example, a ball, needle or roller. The green body may be degassed and sintered for an appropriate length of time at an appropriate temperature. For instance, the sintering temperature may be less than 1800° C. In some embodiments, the sintering range may be from 1650 to 1800° C. and in some cases between 1730 and 1770° C. Sintering time may be dependent, in part, on the sintering temperature and in some cases may be greater than 1 hour and less than 6 hours or greater than 2 hours and less than 4 hours, or between about 160 and 200 minutes.

A resulting sintered body may be densified by hot isostatic pressing after the body has been sintered. HIP pressures may vary depending on the specific body, and it has been found that pressures in the range of about 70 to 250 MPa can result in silicon nitride bodies exhibiting improved features. In some embodiments, the HIP temperature range may be less than 1800° C. For instance, an appropriate range may be from about 1650-1800° C. with a preferred range of 1680-1750° C. Glass encapsulated hot isostatic pressing may be used in some embodiments.

In one set of embodiments the starting silicon nitride powder may contain beta phase grains as well as alpha phase grains. For instance, starting material may include greater than 1%, greater than 1.5%, greater than 1.8% or greater than 2% beta phase silicon nitride grains. The remainder typically may be alpha phase grains. After densification by, for example, sintering and/or hot isostatic pressing, most or all of the alpha phase material may be reprecipitated as beta phase material. In some embodiments, the silicon nitride component of the densified body may include greater than 98%, greater than 99% or greater than 99.9% beta phase silicon nitride.

EXAMPLES

To determine the effect of the addition of lanthana on the physical properties of silicon nitride bodies, silicon nitride bodies made with lanthana were produced and tested against additional experimental materials as well as commercially available silicon nitride bodies. The composition of each test material by weight percent is shown below in Table 2. Composition "N" is an experimental composition including lanthana but no yttria. Composition "G" is a commercially available silicon nitride composition. Composition "B" is an experimental composition that includes yttria but not lanthana.

TABLE 2

| Composition ID | $Si_3N_4$ | $Nd_2O_3$ | $Y_2O_3$ | $Al_2O_3$ | $La_2O_3$ | AlN | TiC | $TiO_2$ |
|---|---|---|---|---|---|---|---|---|
| N | 86.54 | 4 | 0 | 4 | 4 | 0.96 | 0.5 | 0. |
| G | 87.5 | 0 | 5 | 3.5 | 0 | 3.5 | 0 | .50 |
| B | 88.39 | 4.55 | 3.05 | 2.55 | 0 | .96 | .5 | 0 |

Each of the materials was densified into half inch diameter balls using sintering/HIP under conditions described in Table 3. The HIP step for each sample was performed at about 210 MPa pressure and at the temperatures and times indicated in the table.

TABLE 3

| Material | sintering time (min) | sintering temp °C. | HIP time (min) | HIP temp °C. | Density g/cm³ | Vickers Hardness (GPa) | $K_{1C}$ (MPam$^{1/2}$) | MOR (MPa) |
|---|---|---|---|---|---|---|---|---|
| N1 | 90 | 1750 | 120 | 1800 | 3.310 | 14.73 | 6.03 | 982 |
| N2 | 120 | 1750 | 120 | 1750 | 3.306 | 14.43 | 6.6 | 1001 |
| N3 | 180 | 1750 | 120 | 1700 | 3.300 | 14.66 | 8.12 | 841 |
| N4 | 180 | 1700 | 180 | 1700 | 3.307 | 14.59 | 7.15 | 947 |
| G1 | 60 | 1750 | 120 | 1750 | 3.231 | 14.46 | 6.21 | NA |
| G2 | 90 | 1750 | 150 | 1750 | 3.247 | 14.56 | 6.26 | NA |
| G3 | 120 | 1750 | 150 | 1750 | 3.246 | 14.82 | 6.15 | NA |
| G4 | 180 | 1750 | 90 | 1750 | 3.231 | 14.45 | 6.34 | NA |
| B-1 | 90 | 1750 | 120 | 1800 | 3.30 | 14.6 | 7.06 | 1010 |
| B-2 | 120 | 1750 | 120 | 1750 | 3.311 | 14.26 | 7.1 | NA |
| B-3 | 180 | 1750 | 120 | 1700 | 3.308 | 14.93 | 7.1 | NA |
| B-4 | 180 | 1700 | 180 | 1700 | 3.308 | 14.72 | 7.23 | NA |

Samples were evaluated for Vickers Hardness, fracture toughness and, for some of the samples, flexural strength (MOR). Flexural strength testing was not determined for the G samples and for samples B-2 through B-4. Of particular interest was sample N3 that exhibited a fracture toughness (K1C) of 8.12 MPam$^{1/2}$. In addition, other properties of N3 were found to be comparable or superior to those of commercially available compositions. FIG. 1 provides a scanning electron micrograph of material N3 and illustrates the high aspect ratio fine grain microstructure of the material.

The N3 material was also evaluated for Rolling Contact Fatigue (RCF) using ASTM method STP 771 (1982). Results showed that the $L_{10}$ life for the material was greater than $3 \times 10^7$ cycles at 6.3 GPa. This may indicate an extending bearing life with an absence of, or a minimal amount of, spalling.

SEM analysis of grain size for material N3 showed a median grain width of 0.282 μm and a median grain length of 0.576 μm. Compared to compositions G and B, the use of a lanthana based sintering aid appeared to limit the growth of the grain width during reprecipitation, thus providing a grain aspect ratio of greater than 2.0:1. Inspection of the material also revealed an absence of "snowflakes," indicating reduced microporosity. Sub-micron porous regions that appear like snowflakes may be an indicator that the material is susceptible to spalling. Thus, an absence of snowflakes may be considered to be a positive indicator that spallation will not occur.

The densified silicon nitride material of composition N, made using a lanthana-based sintering aid, provided bodies having wear characteristics superior to those of bodies formed using yttria-based materials. Fracture toughness was significantly greater (greater than 8.0) with comparable or improved values for other characteristics. Therefore, a lanthana-based sintering aid can result in a silicon nitride material that may be useful in high wear applications such as, for example, high speed bearings and, in particular, rolling elements for high speed bearings. These lanthana based silicon nitrides, when compared to conventional sintered silicon nitrides, can result in materials that provide longer wear and may be operated at higher speeds than can conventional yttria-based silicon nitride bearing components. In addition, lanthana may be available at high purity and at reasonable cost when compared to conventional sintering aids.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents, patent applications and publications that are cited or referred to in this application are incorporated in their entirety herein by reference.

What is claimed is:

1. A sintered silicon nitride body comprising aluminum nitride, greater than or equal to 1% aluminum oxide, greater than or equal to 1% lanthanum and greater than or equal to 1% neodymium, the body having a mean grain width of less than 0.50 µm and a fracture toughness of greater than 8.0 MPam$^{1/2}$ using the Indentation Four Point Bending technique of Niihara, and the body having a density of greater than 99.9% by the rule of mixtures.

2. The body of claim 1 comprising essentially no rare earth elements other than neodymium and lanthanum.

3. The body of claim 1 comprising greater than or equal to about 4% lanthana.

4. The body of claim 1 wherein the body has been formed at a sintering temperature of about 1750 degrees C. and in a hot isostatic pressing process at a temperature of about 1750 degrees C.

5. The body of claim 1 wherein the body comprises a rolling element in a bearing.

* * * * *